(12) United States Patent
Meyer et al.

(10) Patent No.: US 11,808,495 B2
(45) Date of Patent: Nov. 7, 2023

(54) DEVICE FOR AN ABSORPTION SYSTEM AND METHOD FOR APPLYING AN ABSORBENT

(71) Applicant: TECHNISCHE UNIVERSITÄT BERLIN, Berlin (DE)

(72) Inventors: Thomas Meyer, Berlin (DE); Felix Ziegler, Glienicke (DE)

(73) Assignee: TECHNISCHE UNIVERSITÄT BERLIN, Berlin (DE)

(*) Notice: Subject to any disclaimer, the term of this patent is extended or adjusted under 35 U.S.C. 154(b) by 0 days.

(21) Appl. No.: 16/642,434

(22) PCT Filed: Aug. 31, 2018

(86) PCT No.: PCT/DE2018/100744
§ 371 (c)(1),
(2) Date: Feb. 27, 2020

(87) PCT Pub. No.: WO2019/042499
PCT Pub. Date: Mar. 7, 2019

(65) Prior Publication Data
US 2020/0256596 A1    Aug. 13, 2020

(30) Foreign Application Priority Data
Aug. 31, 2017   (DE) .................... 10 2017 120 080.0

(51) Int. Cl.
*F25B 37/00* (2006.01)
(52) U.S. Cl.
CPC ........ *F25B 37/00* (2013.01); *F25B 2339/021* (2013.01)
(58) Field of Classification Search
CPC .. F25B 37/00; F25B 2339/021; F25B 39/026; F25B 15/04; F25B 30/04; Y02A 30/27; Y02B 30/62; C09K 5/047; F28D 3/04
See application file for complete search history.

(56) References Cited

U.S. PATENT DOCUMENTS 5,419,145 A * 5/1995 Chandler ............... C09K 5/047
62/476
5,622,060 A 4/1997 Kang
(Continued)

FOREIGN PATENT DOCUMENTS

CN    103069244 A    4/2013
DE    3808257 C1    3/1989
(Continued)

OTHER PUBLICATIONS

International Preliminary Report on Patentability issued in International Application No. PCT/DE2018/100744 dated Mar. 3, 2020.
(Continued)

*Primary Examiner* — Frantz F Jules
*Assistant Examiner* — Martha Tadesse
(74) *Attorney, Agent, or Firm* — Harness, Dickey & Pierce, P.L.C.

(57) ABSTRACT

A device is presented for an absorption refrigerator or an absorption heat pump having a heat exchanger through which a working medium flows. The device includes a distribution apparatus for a sorbent which is designed to apply the sorbent to a heat exchange surface of the heat exchanger in a refrigerant environment such that the sorbent, which forms a working pair with the refrigerant, at least partially absorbs the refrigerant from the refrigerant environment and emits heat released in the process to the heat exchanger, or at least partially desorbs the refrigerant from the sorbent in the form of one or more jets onto the heat exchange surface, forming turbulent flows of the sorbent on the heat exchange surface.

12 Claims, 2 Drawing Sheets

(56) References Cited

U.S. PATENT DOCUMENTS

| | | | |
|---|---|---|---|
| 5,730,001 A | 3/1998 | Furukawa | |
| 2010/0242533 A1* | 9/2010 | De Larminat | F25B 41/20 |
| | | | 62/515 |
| 2011/0056664 A1 | 3/2011 | De Larminat et al. | |
| 2012/0298332 A1* | 11/2012 | Petters | F28D 3/00 |
| | | | 165/104.11 |

FOREIGN PATENT DOCUMENTS

| | | | | |
|---|---|---|---|---|
| DE | 69510821 T2 | 12/1999 | | |
| DE | 10134330 C1 | 9/2002 | | |
| JP | 05172438 A * | 7/1993 | | |
| JP | H05172438 A * | 7/1993 | | A63B 53/047 |
| TW | 431902 B | 5/2001 | | |
| WO | WO-8200597 A1 | 3/1982 | | |
| WO | WO-98/012487 A1 | 3/1998 | | |

OTHER PUBLICATIONS

International Search Report (English and German) issued in International Application No. PCT/DE2018/100744, dated Oct. 24, 2018; ISA/EP.

* cited by examiner

DEVICE FOR AN ABSORPTION SYSTEM AND METHOD FOR APPLYING AN ABSORBENT

CROSS REFERENCE TO RELATED APPLICATIONS

This application is a U.S. National Phase Application under 35 U.S.C. 371 of International Application No. PCT/DE2018/100744 filed on Aug. 31, 2018, which claims the benefit of priority from German Patent Application No. 10 2017 120 080.0 filed on Aug. 31, 2017. The entire disclosures of all of the above applications are incorporated herein by reference.

The invention relates to a device for an absorption chiller or an absorption heat pump, an absorber, a desorber, an absorption chiller, an absorption heat pump, a method for dispensing an absorbent in an absorption chiller or an absorption heat pump, a device for a chiller or a heat pump, as well as a method for dispensing a refrigerant in a chiller or a heat pump.

BACKGROUND

An absorption heat pump is a type of heat pump that only requires a comparatively slight mechanical drive. An absorption chiller is technically comparable, except that the actual purpose here is to generate cold (meaning to extract heat). In these types of systems, an absorption agent (absorbent) is dispensed on a heat exchange surface of a heat exchanger or transmitter in an absorber, such that the absorption agent absorbs a refrigerant, for example water or ammonia, which is introduced into the area of the heat exchange surface as a vaporous medium for example. Heat of absorption arises during the absorption of the refrigerant, which can be emitted to a cooling medium in the heat exchanger.

In known devices, the absorption agent is dispensed on the heat exchange surface of the heat exchanger through sprinkling.

Document WO 98/12487 A1 describes a heat exchange process and a heat exchanger, which provide that a vaporous refrigerant be absorbed by a liquid solvent (absorption agent), and that the resultant heat be transmitted to the working medium of a heat exchanger. The absorption agent is discharged by spraying, so that a mist of droplets gets on the heat exchanger, as a result of which the absorption agent is distributed on the heat exchange surface. An essentially stationary film forms superficially on the heat exchange surface.

Document DE 695 10 821 T2 relates to an absorption cycle with a cooling and/or heating system that contains a flowing, working medium, which essentially consists of an aqueous solution of sodium hydroxide, potassium hydroxide or mixtures thereof and an effective additive quantity of a primary, secondary or tertiary aliphatic, cycloaliphatic or aromatic amine, which is capable of elevating the rate of water vapor sorption of the flowing, working medium. Also disclosed is a method for operating an absorption cycle.

Document DE 38 08 257 C1 relates to a compression heat pump or chiller operated with a two-substance working medium with a temperature changer and presentation of the solution in the resorber, which has an inclinedly tilted plate heat exchanger.

Thermally driven heat pumps offer outstanding options for distinctly raising the efficiency of heat provision. When integrated into already existing heating systems, the simplest models of this type of heat pump allow fuel savings, wherein the savings can vary depending on the efficiency of the existing and new heating system, and the necessary temperature on the user side.

Nevertheless, there are limits and obstacles to application. In principle, thermally driven absorption chillers can also be used as a heat pump to provide heating. The cold side of the process (evaporator) here absorbs heat from the heat source (environment, aquifer, etc.) and raises this heat to the useful heating temperature level. By using ambient heat in this way, fossil fuels need only be burned for a portion of the heating process. A working material pair often used in such systems in air-conditioning technology is water and aqueous lithium bromide solution (water/LiBr). It is normally used in sprinkled tube bundle heat exchangers and mass transfer units, and is distinguished by a high efficiency and comparatively high heat and mass transfer densities.

One great impediment to using this technology as a heat pump involves the limitation to ambient temperatures of above 0° C. when using water as the refrigerant, because the heating demand is high precisely in the cold winter months at outside temperatures of around 0° C. and below. At below 0° C., an ammonia and aqueous ammonia solution is commonly used in refrigeration technology as the working material pair. Ammonia/water systems are already in use as gas absorption heat pumps, since the use of ammonia (solidification temperature of pure ammonia is nearly −78° C.) as the refrigerant eliminates the limitation posed by the solidification temperature in the evaporator. However, the volatility of the absorbent water and the toxicity along with the comparatively high working pressures of the ammonia increase the outlay for constructing the systems by comparison to water/LiBr systems.

Salts, which under ambient conditions are present as melts in liquid form, open the door to other natural refrigerants, for example ethanol, for absorption heat pump technology. For example, a material pair of ethanol/ethyl-methyl-imidazolium-di-ethyl-phosphate [EMIM][DEP] can be used in an absorption chiller system. It turns out that the material pair ethanol [EMIM][DEP] can be used for providing heat even at evaporator temperatures of below 0° C.

When used in the known, sprinkled horizontal tube bundle heat and material exchangers, ionic liquids as the absorbent, for example ethanol, do not even approximately (in part <50%) reach the heat and material exchanging densities of an aqueous lithium bromide solution. The reasons for the latter involve the less favorable material properties.

By comparison to an aqueous lithium bromide solution, solutions of ethanol in ionic liquids have distinctly higher dynamic viscosities (by a factor of 4 to 20), which makes the trickling film distinctly thicker while flowing (by a factor of 1.5 to 3), and hence leads to a poorer heat throughput from the film surface to the flowing, cooling water inside of the tubes. The effect is magnified by the lower thermal conductivity of the ionic liquids. As a consequence, the film surface is not cooled that well, which impairs the vapor absorption on the film surface. In addition, the higher viscosity of the ionic liquid can be expected to yield a lower diffusion coefficient, so that the diffusion of ethanol from the film surface in the film is also inhibited by comparison to water in an aqueous lithium bromide solution.

SUMMARY

The object of the invention is to indicate an improved technology in conjunction with dispensing an absorption agent in an absorption chiller or an absorption heat pump, so as to improve the absorption of a refrigerant that comprises a working pair with the absorption agent. In addition, an improved technology is to be created in conjunction with dispensing a refrigerant in a chiller or a heat pump.

The object is achieved by providing a device for an absorption chiller or an absorption heat pump according to independent claim 1. Also provided are an absorber, a desorber, an absorption chiller as well as an absorption heat pump according to the independent claims 11, 12, 13 and 14. Also provided is a method for dispensing an absorption agent in an absorption chiller or an absorption heat pump according to independent claim 15. Also provided are a device for a chiller or a heat pump according to independent claim 16, as well as a method for dispensing a refrigerant in a chiller or a heat pump according to independent claim 17. Configurations are the subject of the dependent subclaims.

One aspect provides a device for an absorption chiller or an absorption heat pump that has a heat exchanger, through which a working medium flows. A distributing device for an absorption agent (absorbent) is provided, which is configured to dispense the sorption agent on a heat exchange surface of the heat exchanger in a refrigerant environment, such that the sorption agent, which forms a working pair with the refrigerant, at least partially absorbs the refrigerant from the refrigerant environment, and in doing so emits released heat (via the heat exchange surface) to the heat exchanger or at least partially desorbs the refrigerant from the sorption agent in an environment of the sorption agent, and in doing so absorbs heat from the heat exchanger. The distributing device has a jet device, which is configured to emit the sorption agent on the heat exchange surface in the form of one or several jets, and in so doing generate turbulent flows of the sorption agent on the heat exchange surface.

Another aspect provides an absorber for an absorption chiller or an absorption heat pump with such a device. A further aspect provides a desorber for an absorption chiller or an absorption heat pump with such a device. Additional aspects relate to an absorption chiller as well as an absorption heat pump with such a device.

Another aspect relates to a method for dispensing an absorbent in an absorption chiller or an absorption heat pump, through which a working medium flows. A sorption agent is dispensed on a heat exchange surface of the heat exchanger by means of a distributing device in a refrigerant environment, such that the sorption agent, which forms a working pair with the refrigerant, at least partially absorbs the refrigerant from the refrigerant environment, and in doing so emits released heat to the heat exchanger or at least partially desorbs the refrigerant from the sorption agent in an environment of the sorption agent, and in doing so absorbs heat from the heat exchanger. The distributing device has a jet device, with which the sorption agent is emitted on the heat exchange surface in the form of one or several jets, and thereby turbulent flows of the sorption agent are generated on the heat exchange surface.

Another aspect provides a device for a chiller or a heat pump with a heat exchanger, through which a working medium flows, and a distributing device for a refrigerant. The distributing device is configured to dispense the refrigerant on a heat exchange surface of the heat exchanger in a refrigerant environment, such that the refrigerant is at least partially evaporated in the refrigerant environment, and in so doing absorbs heat from the heat exchanger. The distributing device here has a jet device, which is configured to emit the refrigerant on the heat exchange surface in the form of one or several jets, and in so doing generate turbulent flows of the refrigerant on the heat exchange surface.

Another aspect relates to a method for dispensing a refrigerant in a chiller or a heat pump, in which a working medium flows through a heat exchanger, and a refrigerant is dispensed on a heat exchange surface of the heat exchanger in a refrigerant environment by means of a distributing device. The refrigerant is here at least partially evaporated in the refrigerant environment, and absorbs heat from the heat exchanger. The distributing device has a jet device, with which the refrigerant is emitted on the heat exchange surface in the form of one or several jets, and in so doing generates turbulent flows of the refrigerant on the heat exchange surface.

The proposed technologies improve the processes of absorbing and desorbing the refrigerant in the area of the heat exchange surface on the heat exchanger or transmitter. The emission process and the turbulent flows of the sorption agent it induces on the heat exchange surface in the form of one or several liquid jets improve the absorption and desorption of the refrigerant.

The working medium in the heat exchanger serves as a heat transmitter or heat exchanger fluid, and thereby forms a cooling or heating medium.

The refrigerant environment is an environment that contains refrigerant vapor.

For example, the various embodiments of proposed technologies can be used on the heating market mentioned at the outset. For example, the use of ethanol as the refrigerant with the help of ionic liquids as the absorbent having the same or similarly high heat and material transport densities as an aqueous lithium bromide solution enables the application of this highly efficient absorption heat pump technology at ambient temperatures far below 0° C. In addition, the use of plate heat exchangers and material exchangers is beneficial when it comes to systems to be manufactured in large numbers as easily as possible.

Additional possible fields of application include the thermally driven provision of ultralow temperatures of up to −20° C., for example for use in refrigerated warehouses or brewery operations, which necessitate a cooling to below 0° C. for storing foodstuffs.

The ethanol/ethyl-methyl-imidazolium-di-ethyl-phosphate material pair can be used just as other media, for example to include an aqueous lithium bromide solution or mixtures of ionic liquids with other refrigerants, for example such as methanol or the like.

The jet device can be configured to emit sorption agents on the heat exchange surface in the form of several parallel jets.

The jet device can be configured to emit the sorption agent on the heat exchange surface with one or several transverse jets, wherein the transverse jets run transverse to the heat exchange surface. The transverse jets can be emitted on the heat exchange surface at an angle of about 90°.

The jet device can be configured to emit the sorption agent on the heat exchange surface with one or several inclined jets, wherein the inclined jets run inclined to the heat exchange surface. The jet device can be configured to emit both transverse jets and inclined jets on the heat exchange surface.

The jet device can have a jet plate with a flat distribution of spaced apart jet sources, which each comprise a source for one of the several jets of the sorption agent. The jet sources can have a jet nozzle in this or other embodiments. The jet sources can have one or several hole nozzles in this or other embodiments. The jet plate can be designed with a perforated plate, which has an arrangement of spaced apart openings that each serve as a jet source. In this or other embodiments, the several jets can be designed to essentially completely cover the heat exchange surface on the heat exchanger. With respect to its flat expansion, the jet plate with the jet sources can essentially correspond to the flat expansion of the opposing heat exchange surface of the heat exchanger.

The sorption agent can be dispensed by means of the one or the several jets on the heat exchange surface so as to generate turbulent flows in a surface film of the sorption agent. In this embodiment, a surface film with the turbulent flows forms on the heat exchange surface, and absorbs or desorbs the refrigerant.

The jet device can be configured to dispense the jets as continuous jets of the sorption agent. Alternatively, the jets can be dispensed as discontinuous jets of the sorption agent on the heat exchange surface, for example in the form of pulsing jets. A combination of continuous and discontinuous jets can be provided.

It can be provided that the turbulent flows of the sorption agent on the heat exchange surface be induced by means of an elevated emission speed of the sorption agent. From the standpoint of the invention, an elevated emission speed of the sorption agent is an emission speed that exceeds a speed that arises from a dead weight pressure of the sorption agent in the jet device and a gravitational acceleration when the sorption agent hits the heat exchange surface.

It can be provided that the sorption agent exit the jet device with an elevated discharge velocity owing to an elevated preliminary pressure. From the standpoint of the invention, an elevated preliminary pressure is an excess pressure greater than 0.25 bar by comparison to the pressure during the discharge of the sorption agent. The elevated preliminary pressure can comprise a differential pressure of 0.25 bar to 2.50 bar, preferably 1.00 bar to 2.50 bar. The pressure difference is generated by a pump. From the standpoint of the invention, an elevated discharge speed is a discharge speed at an elevated preliminary pressure. The elevated discharge speed can comprise a range of 3 m/s to 15 m/s, preferably of 7 m/s to 15 m/s.

The elevated discharge speed of the sorption agent from the jet device can lead to the elevated emission speed of the one or the several jets while hitting the heat exchange surface, so that turbulent flows of the sorption agent are induced on the heat exchange surface. In particular, this eliminates the need to add an additive into the sorption agent. It can also be provided that at least one additive be added to the sorption agent. It can be provided that the one or the several jets hit the heat exchange surface with an emission speed of 3 m/s to 15 m/s, preferably of 7 m/s to 15 m/s.

It can be provided that the turbulent flows of the refrigerant on the heat exchange surface be induced by means of an elevated emission speed of the refrigerant. This can take place in the same way that the flows of sorption agent were induced.

The emission of jets can take place at any angle relative to the gravitational direction. In particular, it can be provided that the one or the several jets be emitted on the heat exchange surface at an angle perpendicular to the gravitational direction. It can be provided that the heat exchange surface be aligned parallel to the gravitational direction, i.e., that the surface normals on the heat exchange surface be aligned perpendicular to the gravitational direction. Alternatively, it can be provided that the one or the several jets be emitted on the heat exchange surface parallel to the gravitational direction, and that the heat exchange surface be aligned perpendicular to the gravitational direction. The high emission speed of the jets makes it possible to induce turbulent flows of the sorption agent or refrigerant on the heat exchange surface independently of the emission direction.

The configurations relating to the sorption agent can be correspondingly provided in conjunction with the refrigerant.

An example can provide a device for an absorption chiller or an absorption heat pump, with a heat exchanger through which a working medium flows; and a distributing device for a sorption agent, which is configured to dispense the sorption agent on a heat exchange surface of the heat exchanger in an environment that contains refrigerant vapor, such that the sorption agent, which forms a working pair with the refrigerant, at least partially absorbs the refrigerant from the environment that contains the refrigerant vapor, and heat released in so doing is emitted to the heat exchanger, or the refrigerant is at least partially desorbed from the sorption agent in an environment of the sorption agent, and heat for this purpose is delivered by the heat exchanger. The distributing device can here have a jet device, which is configured to emit the sorption agent in the form of one or several jets on the heat exchange surface, and in so doing generate turbulent flows of the sorption agent on the heat exchange surface.

Another example can provide a device for an absorption chiller or an absorption heat pump that has a heat exchanger through which a working medium flows. A distributing device for a sorption agent (absorbent) can be provided, which is configured to dispense the sorption agent on a heat exchange surface of the heat exchanger in a refrigerant environment, such that the sorption agent, which forms a working pair with the refrigerant, at least partially absorbs the refrigerant from the refrigerant environment, and in so doing emits released heat (via the heat exchange surface) to the heat exchanger or at least partially desorbs the refrigerant from the sorption agent in a refrigerant environment, and in doing so absorbs heat from the heat exchanger. The distributing device can have a jet device, which is configured to emit the sorption agent on the heat exchange surface in the form of one or several jets, and in so doing generate turbulent flows of the sorption agent on the heat exchange surface.

In conjunction with the method for dispensing the sorption agent in an absorption chiller or an absorption heat pump, the configurations described above with respect to the device can be provided. The refrigerant can be present in an environment of the sorption agent. The refrigerant can be at least partially desorbed from the sorption agent into the refrigerant environment, and in so doing absorb heat from the heat exchanger.

A liquid from the following group can be used as the absorbent: Water, solutions of salt, molten salt and ionic liquid.

DESCRIPTION OF EXEMPLARY EMBODIMENTS

Additional exemplary embodiments will be described in greater detail below drawing reference to the figures. Shown here on:

Figure 1:
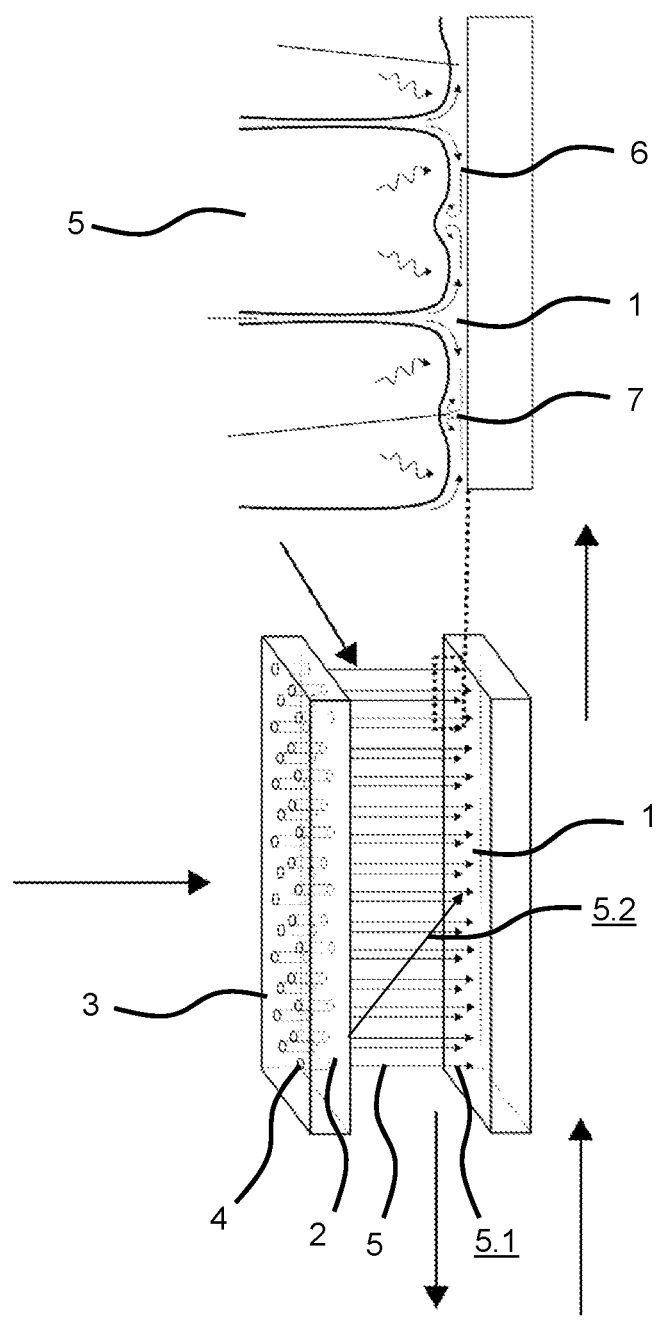
FIG. 1 is a schematic illustration of a heat exchange surface of a heat exchanger or transmitter configured as an absorber.

FIG. 1 shows a schematic illustration of a heat exchange surface 1 of a heat exchanger or transmitter configured as an absorber, through which flows a working medium designed as a cooling medium, for example cooling water. Arranged opposite the heat exchange surface 1 is a jet device 2, which in the exemplary embodiment shown is formed with a perforated plate 3. The perforated plate 3 has an arrangement of spaced apart holes or openings 4, which each serve as a jet source for a jet 5, with which an absorption agent (absorbent) is emitted on the opposing heat exchange surface 1. A refrigerant is further introduced in vapor form, for example water vapor, such that the refrigerant is at least partially absorbed by the absorbent, which gives rise to absorption heat that can be dispensed to the working medium of the heat exchanger via the heat exchange surface 1.

In a detailed illustration, FIG. 1 (see top illustration) shows how the jets 5 of the absorption agent strike the heat exchange surface 1 at an elevated emission speed, such that a surface film 6 with turbulent flows 7 forms there. The turbulent flows 7 support and intensify the absorption of the refrigerant by the absorbent.

The jets essentially hit the heat exchange surface 1 at a right angle. An inclined progression can be provided in relation to the heat exchange surface. The jets 5 essentially run parallel in the depicted exemplary embodiment.

In particular, the proposed technology can also be used in conjunction with a mixture of ionic liquid and refrigerant, with the objective of elevating the heat and material flow densities. Disadvantageous heat and material transfer properties of the ionic liquid are overcome.

In the known sprinkled horizontal tubes, the mixing of the film on the heat exchange surface essential for reaching high flow densities takes place mainly as the salt solution drips off of or on the tube, while the flow densities during a flow on the exterior side of the tube are determined essentially by molecular material and heat transport transverse to the direction of flow of the film, and are low.

The technologies proposed here for emitting the absorbent distinctly elevate the heat and material transport densities during the entire film flowing process via the forced mixing of the film (similar to mixing by means of drops in the sprinkled horizontal tubes). In particular with respect to the materials with low thermal conductivities and diffusion coefficients, performance-enhancing effects can be achieved.

The mixing of the absorbing film on the heat exchange surface 1 is improved, and generated by means of the (thin) liquid jets that are spaced narrowly apart from each other and distributed in high numbers over the entire carrier surface, which "shoot" the absorbent on an inclined, cooled, flat and possibly surface-structured plate. The turbulent film flow induced in this way on the heat exchange surface 1 ensures a better mixing by comparison to a flow on the horizontal tube exterior side, and hence an enhanced performance in terms of heat and material transport.

Ionic liquids or other absorbents with low molecular heat and material transport coefficients can be used to achieve at least the heat and material transport densities of absorption chillers/heat pumps with an aqueous lithium bromide solution. In addition, the use of flat plates as heat and material carriers enables more variable, compact and simple designs by comparison to horizontal tube bundle carriers.

Figure 2:
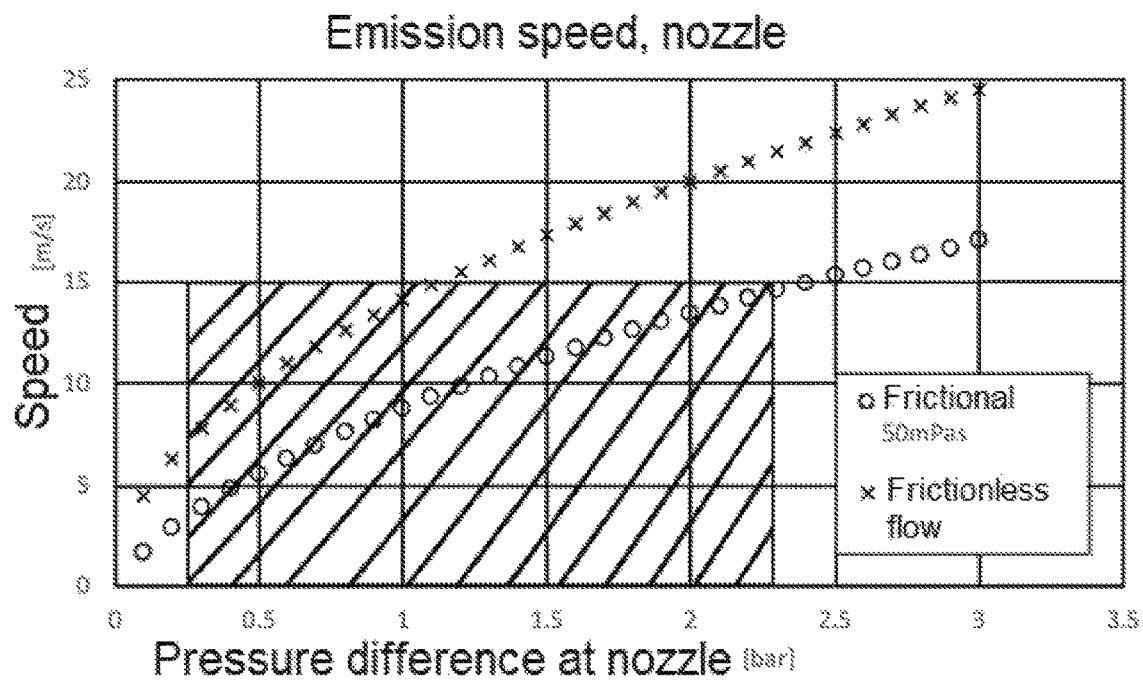
FIG. 2 is a schematic illustration of a discharge speed of a sorption agent on a hole nozzle as a function of a pressure difference present at the hole nozzle.

FIG. 2 shows the progression of the emission speed of a sorption agent on a hole nozzle under an elevated pressure as a function of the pressure difference applied to the hole nozzle. The maximum achievable emission speeds at corresponding pressure differences are marked with crosses. Friction effects were here ignored. The emission speeds given a frictional flow through the hole nozzle with a dynamic viscosity of 50 mPas are marked with circles. A dynamic viscosity of 50 mPas is comparatively high, in particular by roughly a factor of 10 higher than typical absorbents like aqueous lithium bromide. The typical operating pressure range is shaded grey in the diagram, and depending on pump type lies between 0.25 and 2.50 bar. As a consequence, real (frictional) jet speeds of 3 to 15 m/s are to be expected.

Figure 3:
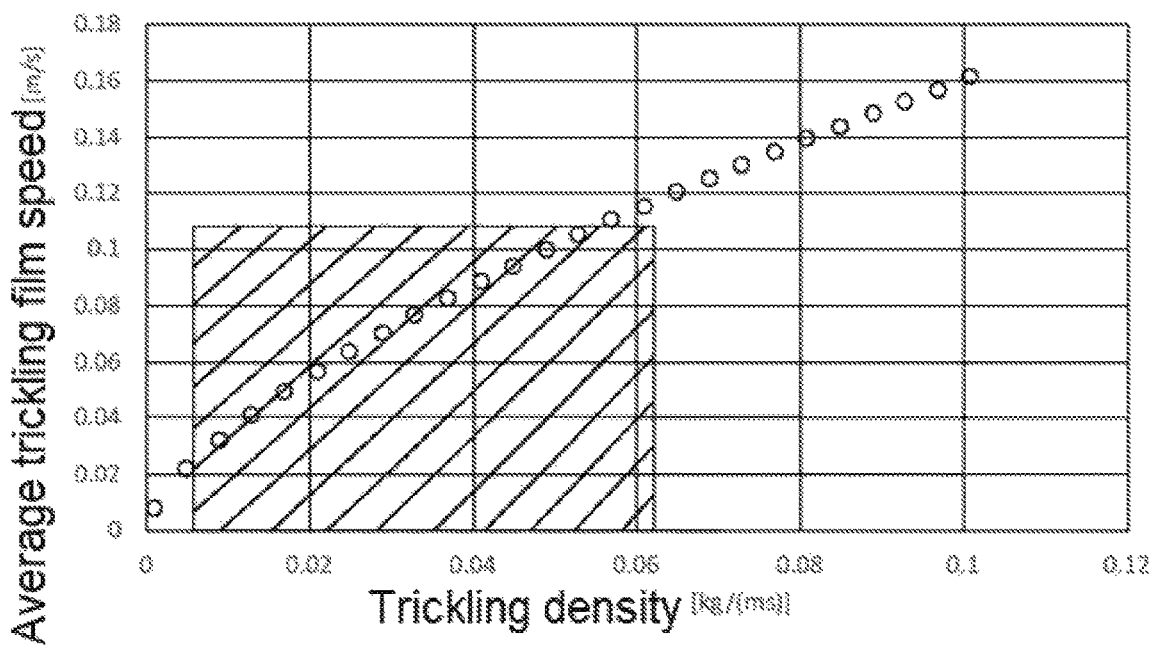
FIG. 3 is a schematic illustration of average trickling film speeds of a gravity-driven dispensing and distributing system corresponding to prior art for substance data about aqueous lithium bromide.

In a comparison to the progression depicted on FIG. 2, FIG. 3 shows the average trickling film speeds of a gravity-driven dispensing and distributing system corresponding to prior art for material data about aqueous lithium bromide. Common trickling densities are also shaded gray, and range from 0.002 to 0.070 kg/(ms). The accompanying average trickling film speeds range from 0.02 to 0.11 m/s, and are smaller than the jet speeds by a factor of 100, i.e., by two orders of magnitude.

The features disclosed in the above specification, the claims and in the drawing can be significant for realizing the various embodiments, both taken separately or in any combination.

The invention claimed is:

1. A device comprising:
   a heat exchanger, through which a working medium flows; and
   a distributing device for a sorption agent, which is configured to dispense the sorption agent on a heat exchange surface of the heat exchanger in a refrigerant environment, such that the sorption agent, which forms a working pair with a refrigerant,
   at least partially absorbs the refrigerant from the refrigerant environment, and in doing so emits released heat to the heat exchanger, or
   at least partially desorbs the refrigerant from the sorption agent in an environment of the sorption agent, and in doing so absorbs heat from the heat exchanger,
   wherein the distributing device has a jet device, which is configured to emit the sorption agent on the heat exchange surface in the form of one or several rays, and in so doing generate turbulent flows of the sorption agent on the heat exchange surface, and wherein the jet device is configured to emit the sorption agent on the heat exchange surface at an emission speed of about 3 m/s to about 15 m/s,
   wherein the emission speed exceeds a speed that arises from a dead weight pressure of the sorption agent in the jet device and a gravitational acceleration when the sorption agent hits the heat exchange surface.

2. The device according to claim 1, wherein the jet device is configured to emit the sorption agent on the heat exchange surface in the form of several parallel jets.

3. The device according to claim 1, wherein the jet device is configured to emit the sorption agent on the heat exchange surface with one or several transverse jets, wherein the one or several transverse jets run transverse to the heat exchange surface.

4. The device according to claim 1, wherein the jet device is configured to emit the sorption agent on the heat exchange surface with one or several inclined jets, wherein the one or several inclined jets run inclined to the heat exchange surface.

5. The device according to claim 1, wherein the jet device has a jet plate with a flat distribution of spaced apart jet sources, which each comprise a source for one of the several jets of the sorption agent.

6. The device according to claim 1, wherein the jet device is configured to dispense the jets as continuous jets of the sorption agent.

7. The device according to claim 1, wherein the jet device is configured to emit the sorption agent from the jet device at a differential pressure of about 0.25 bar to about 2.50 bar.

8. The device according to claim 1, wherein the jet device is configured to emit a jet or several jets on the heat exchange surface at an angle perpendicular to a gravitational direction.

9. An absorber for an absorption chiller or an absorption heat pump, with a device according to claim 1, wherein the refrigerant is at least partially absorbed from the refrigerant environment, and in so doing emits released heat to the heat exchanger.

10. A method for dispensing an absorption agent, in which
a working medium flows through a heat exchanger; and
a sorption agent is dispensed on a heat exchange surface of the heat exchanger by means of a distributing device in a refrigerant environment, such that the sorption agent, which forms a working pair with a refrigerant,
at least partially absorbs the refrigerant from the refrigerant environment, and in doing so emits released heat to the heat exchanger, or
at least partially desorbs the refrigerant from the sorption agent in an environment of the sorption agent, and in doing so absorbs heat from the heat exchanger, wherein the distributing device has a jet device, with which the sorption agent is emitted on the heat exchange surface in the form of one or several rays, and wherein the jet device is configured to emit the sorption agent on the heat exchange surface at an emission speed of about 3 m/s to about 15 m/s and thereby turbulent flows of the sorption agent are generated on the heat exchange surface,
wherein the emission speed exceeds a speed that arises from a dead weight pressure of the sorption agent in the jet device and a gravitational acceleration when the sorption agent hits the heat exchange surface.

11. A device for a chiller or a heat pump, comprising: a heat exchanger, through which a working medium flows, and a distributing device for a refrigerant, which is configured to dispense the refrigerant on a heat exchange surface of the heat exchanger in a refrigerant environment, such that the refrigerant is at least partially evaporated in the refrigerant environment, and in so doing absorbs heat from the heat exchanger, wherein the distributing device has a jet device, which is configured to emit the refrigerant on the heat exchange surface in the form of one or several rays as continuous jets of the a sorption agent, and in so doing generate turbulent flows of the refrigerant on the heat exchange surface and wherein the jet device is configured to emit the sorption agent on the heat exchange surface at an emission speed of about 3 m/s to about 15 m/s, wherein the emission speed exceeds a speed that arises from a dead weight pressure of the sorption agent in the jet device and a gravitational acceleration when the sorption agent hits the heat exchange surface.

12. A method for dispensing a refrigerant in a chiller or a heat pump, in which a working medium flows through a heat exchanger; and a the refrigerant is dispensed on a heat exchange surface of the heat exchanger by means of a distributing device in a refrigerant environment, such that the refrigerant is at least partially evaporated in the refrigerant environment, and in so doing absorbs heat from the heat exchanger; wherein the distributing device has a jet device, with which the refrigerant is emitted on the heat exchange surface in the form of one or several rays, and wherein the jet device is configured to emit a sorption agent on the heat exchange surface at an emission speed of about 3 m/s to about 15 m/s and in so doing generates turbulent flows of the refrigerant on the heat exchange surface, wherein the emission speed exceeds a speed that arises from a dead weight pressure of the sorption agent in the jet device and a gravitational acceleration when the sorption agent hits the heat exchange surface.

* * * * *